United States Patent

Schnepel

[15] 3,702,546
[45] Nov. 14, 1972

[54] TORQUE LIMITING ADAPTER

[72] Inventor: Lawrence S. Schnepel, Sudbury, Mass.

[73] Assignee: The X-4 Corporation, West Acton, Mass.

[22] Filed: Aug. 17, 1970

[21] Appl. No.: 64,409

[52] U.S. Cl..................................64/29, 81/524 A
[51] Int. Cl................................F16d 7/06
[58] Field of Search......................64/24; 81/52.4

[56] References Cited

UNITED STATES PATENTS

| 2,969,132 | 1/1961 | Stewart | 64/29 X |
| 3,441,115 | 4/1969 | Gunther | 64/29 X |
| 3,451,514 | 6/1969 | Ristow | 81/52.4 X |
| 2,968,979 | 1/1961 | Aijala | 81/52.4 |
| 2,984,133 | 5/1961 | Livermont | 81/52.4 |

Primary Examiner—Edward G. Favors
Attorney—Roberts, Cushman and Grover

[57] ABSTRACT

A torque release adapter in which the torque at which release is effected is controlled by variable spring pressure applied axially with respect to the rotational force applying the torque; characterized in that the adjusted torque at which release takes place is unaffected by the application of axial force to the device applied in conjunction with the rotational force.

4 Claims, 2 Drawing Figures

PATENTED NOV 14 1972

3,702,546

INVENTOR
LAWERENCE S. SCHNEPEL
BY Roberts, Cushman & Grover
ATTY'S

TORQUE LIMITING ADAPTER

BACKGROUND OF THE INVENTION

Torque limiting devices for limiting the torque which may be applied to tighten nuts, screws, bolts, and the like, are not new per se. A device of improved kind designed for this purpose is shown and claimed in my pending application Ser. No. 30,043, filed Apr. 20, 1970 now U.S. Pat. No. 3662628. In the aforesaid application there are axially aligned shafts embodying confronting circular parts containing recesses in which there are arranged ball bearings and there are adjustable spring means for applying axial pressure to the circular parts to effect transmission of a predetermined torque from one shaft to the other. If an excessive amount of axial pressure is applied to the aforesaid adapter, it will be caused to transmit a torque greater than that which it was adjusted to apply and hence may strip the threads of the nuts or bolts of the parts being joined. The structure illustrated herein is of the foregoing kind but designed to prevent the application of such axial force from influencing the torque.

SUMMARY

As herein illustrated, the adapter comprises shafts supported in axial alignment and a part on one shaft yieldably held engaged with a part on the other; characterized in that the part on the one shaft is operably connected thereto to partake of the rotation of the one shaft but permits axial movement of the one shaft relative thereto, and of means for adjustably applying said yielding engagement between the parts to control the relative rotation of the parts independently of the axial pressure applied to the shafts. The part on the one shaft is an annular ring mounted on the one shaft in confronting relation to the part on the other shaft and said annular ring and said other part contain peripherally spaced recesses between which there are mounted balls for transmitting the rotation of the one ring to said other part. The ring contains at its inner face and the shaft at its outer face recesses containing balls for transmitting rotation of the shaft to the ring. To permit axial movement the recesses in the ring and the shaft are axially elongate.

The invention will now be described in greater detail with reference to the accompanying drawings wherein.

Figure 1:
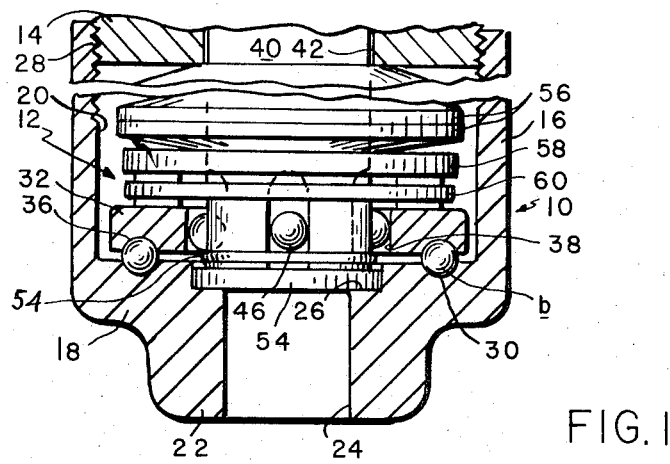
FIG. 1 is a fragmentary diametrical section of the device.
Figure 2:
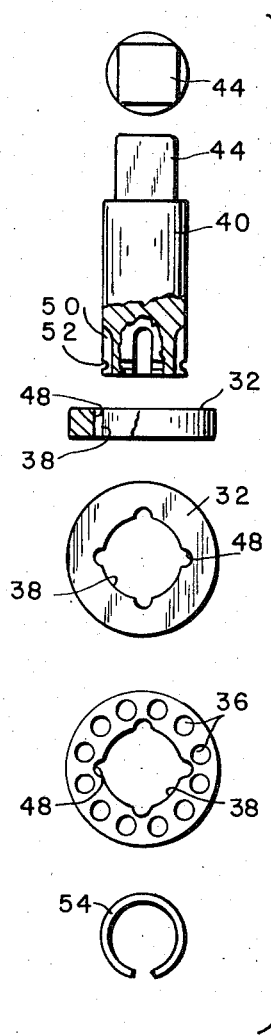
FIG. 2 is an exploded view of the device showing the several components making up the device, some of which are in elevation and others of which are partly in elevation and partly in section.

Referring to the drawings, the torque release adapter comprises a receptacle 10 within which is mounted torque release mechanism 12. A closure cap 14 supports the torque release mechanism 12 in the receptacle 10 and optionally provides for adjustment for the amount of torque which is to be transmitted by the adapter.

The receptacle 10 (FIG. 1) is of circular cross-section having a cylindrical side wall 16 closed at one end by an end wall 18 and open at the other end and providing within the wall a cylindrical chamber 20. The end wall 18 has a portion 22 of reduced diameter and contains a centrally located opening 24 of non-circular configuration for receiving a tool or other implement for applying rotation thereto or for receiving a nut or other fastening to which a turning couple is to be applied through the adapter. The opening 24 extends through the end wall to the interior of the chamber 20, its axis coinciding with the axis of the chamber and at its inner end is enlarged diametrically to provide a shallow recess 26. The open end of the receptacle is provided at its inner side with threads 28.

As disclosed in the application referred to herein, the inner side of the end wall 18 which is flat contains a plurality of recesses 30 arranged in a circle about the axis of the receptacle close to the wall 16, the recesses being hemispherical in configuration for receiving ball bearings $b$. As herein illustrated, there are twelve such recesses spaced regularly about the axis of the receptacle. Within the receptacle there is mounted the torque release mechanism 12 which comprises an annular disc 32 corresponding substantially in diameter to the inside diameter of the receptacle but enough smaller to turn freely therein which has at its lower side a plurality of recesses 36 corresponding in number to the recesses 30. The recesses 36 are located at the same radial distance from the axis of the disc and of the receptacle as are the recesses 30 from the axis of the receptacle.

In accordance with this invention the annular disc 32 contains a central opening 38 of relatively large diameter and is mounted on a shaft 40 which extends axially therefrom through the open end of the receptacle through an opening 42 in the closure cap 14 and has at the outwardly projecting end thereof a non-circular reduced portion 44 for receiving an open end socket wrench or the like for applying a turning force to the shaft 40. Rotation of the shaft 40 is imparted to the annular disc 32 by means of a plurality of balls 46 set into recesses 48 and 50, respectively, at the inner side of the annular ring 32 and the outer side of the shaft 40. The recesses 48 are semicircular in cross-section and of uniform depth from surface to surface of the annular disc. The recesses 50 are also semicircular in configuration and are elongate axially of the shaft 40. At the lower end of the shaft 40 there is a peripheral groove 52 for receiving a locking ring 54 which after the shaft is assembled with the annular disc will prevent the disc from slipping off the lower end of the shaft. As in the device shown in the above-mentioned application a flat disc 54 is mounted in the recess 26 so that the lower end of the shaft 40 bears against it.

Rotation of the annular disc 32 is imparted to the receptacle 10 and hence to the end wall 22 containing the opening 24 by the balls $b$ which, as related before, are disposed between the annular disc and the inner side of the end wall 18. The amount of torque that can be transmitted before release is controlled by pairs of oppositely dished spring washers 56 disposed about the shaft 40 between the lower side of the adjustable cap 14 and the upper side of a washer 58 and roller bearing assembly 60 mounted on the shaft next to the disc 32.

As thus constructed, the shaft 40 is free to move axially within the annular disc 32 and so any axial pressure applied to the shaft 40 while effecting its rotation will not be transmitted to the annular disc 32 and in no way will change the release torque applied between the annular disc and the end wall 18 by the spring washers 56; hence it is possible to more accurately adjust the point of release so that for critical installations there is no possibility of overstressing the parts being applied no matter how much axial pressure is applied to the device.

The improvement over the device comprising the subject matter of the copending application resides in so constructing it that it is impossible to apply an axial pressure which in any way will influence the point of torque release and makes the tool especially useful where the point of release is highly critical and the operators are perhaps not sufficiently skilled or do not appreciate the fact that the endwise pressure applied would very substantially increase the amount of torque which could be applied with the prior device.

It should be understood that the present disclosure is for the purpose of illustration only and that this invention includes all modifications and equivalents falling within the scope of the appended claims.

I CLAIM:

1. A torque release adapter for applying rotational force up to a predetermined maximum, comprising shafts supported in coaxial alignment, a part on one shaft yieldably held engaged with a part of the other shaft, said part on the one shaft comprising an annular ring mounted on the one shaft in confronting relation to the part on the other shaft, said annular ring being operably connected to the one shaft to partake of the rotation thereof but being permitted to move axially thereon, said annular ring and said other part containing peripherally spaced recesses between which are mounted balls for transmitting rotation of the annular ring to said other part, and means for adjustably applying said yielding engagement between the annular ring and said other part to control relative rotation of the part independently of the axial pressure applied to the shafts.

2. Apparatus according to claim 1, wherein said ring contains at its inner face and the shaft at its outer face recesses containing balls, said balls transmitting rotation of the shaft to the ring.

3. Apparatus according to claim 2, wherein the recesses in the shaft are axially elongate.

4. Apparatus according to claim 3, wherein the end of the shaft contains a peripheral groove for receiving a spring ring.

* * * * *